United States Patent
Prem Bianzino et al.

(10) Patent No.: US 10,536,574 B2
(45) Date of Patent: Jan. 14, 2020

(54) METHOD, SYSTEM AND APPLICATION FOR IMPROVED AUTHENTICATION FOR MOBILE DEVICE USERS

(71) Applicant: Telefónica Digital España, S.L.U., Madrid (ES)

(72) Inventors: Aruna Prem Bianzino, Madrid (ES); Rafael De Las Heras Del Dedo, Madrid (ES); Sergio De Los Santos, Madrid (ES)

(73) Assignee: Telefónica Digital España, S.L.U., Madrid (ES)

( * ) Notice: Subject to any disclaimer, the term of this patent is extended or adjusted under 35 U.S.C. 154(b) by 0 days.

(21) Appl. No.: 16/183,764

(22) Filed: Nov. 8, 2018

(65) Prior Publication Data

US 2019/0149653 A1    May 16, 2019

(30) Foreign Application Priority Data

Nov. 10, 2017  (EP) .................................. 17382759

(51) Int. Cl.
 *H04W 12/06*  (2009.01)
 *H04M 1/725*  (2006.01)

(52) U.S. Cl.
 CPC ....... *H04M 1/72577* (2013.01); *H04W 12/06* (2013.01)

(58) Field of Classification Search
 CPC ...... G06F 3/017; G06F 21/34; G06F 21/6227; G06F 21/31; G06F 21/6245; G06F 1/1694; G06F 21/83; G06F 21/00; G06F 21/35; H04W 12/06; H04W 12/08; H04W 12/00508; H04W 12/00; H04M 1/7253; H04M 1/72527; H04M 1/72519; H04M 1/72533; H04M 1/72577
 See application file for complete search history.

(56) References Cited

U.S. PATENT DOCUMENTS

| | | | |
|---|---|---|---|
| 2007/0251996 A1 | 11/2007 | Kanevsky et al. | |
| 2013/0019292 A1 | 1/2013 | Varshavsky et al. | |
| 2013/0268767 A1* | 10/2013 | Schrecker | G06F 21/31 713/185 |
| 2014/0266597 A1* | 9/2014 | Narendra | G05B 1/03 340/5.81 |
| 2016/0162676 A1* | 6/2016 | Myers | G06F 21/35 726/9 |
| 2017/0344140 A1* | 11/2017 | Henderson | G06F 21/32 |
| 2019/0016302 A1* | 1/2019 | Saiki | B60R 25/24 |

FOREIGN PATENT DOCUMENTS

EP    2354897    8/2011

OTHER PUBLICATIONS

European Search Report and the European Search Opinion dated Jan. 9, 2018 From the European Patent Office Re. Application No. 17382759.3. (8 Pages).

* cited by examiner

*Primary Examiner* — Daniel Lai

(57) ABSTRACT

Present invention provides a method, system and application for providing authentication of a mobile device user, based on the measurement of electromagnetic fields modified by a pre-established movement of a specific magnetic token associated to the user. This univocal process will be able to obtain new authentication factors, including something that the user owns (i.e., the token), something that the user knows (i.e., the interaction between the token and the device), and somewhere that the user is (i.e., where the interaction takes place).

14 Claims, 3 Drawing Sheets

METHOD, SYSTEM AND APPLICATION FOR IMPROVED AUTHENTICATION FOR MOBILE DEVICE USERS

RELATED APPLICATION

This application claims the benefit of priority of European Patent Application No. 17382759.3 filed on Nov. 10, 2017, the contents of which are incorporated herein by reference in their entirety.

FIELD AND BACKGROUND OF THE INVENTION

Present invention generally relates to security in services provided to mobile communication device users in a communications network. More specifically, it relates to authentication of mobile device users based on electromagnetic field measurement and on the use of a magnetic object (also called magnetic token) associated to the user.

Mobile communication devices (also called mobile devices), such as cellular or mobile telephones, tablets, i-pads, notebooks . . . are everyday more and more used. And these devices are used not only to place telephone calls but for an enormous range of services. The use of mobile communication devices to provide an everyday wider range of services makes essential a security environment where the mobile device user (to which the service is provided) is univocally identified, in order to ensure that the service is provided to the correct user and not to an unauthorized user.

The need of identifying users consuming different types of services is closely related to the prevention of identity theft but privacy security must also be taken into account. It is therefore of extreme interest to establish whether users are who they claim to be, but it is as much important to keep confidentiality about the exchanged information in such process.

The user identification process is usually based on some credentials, whose ownership and verification guarantee to check the user identity. The used credentials are usually emitted by a trusted authority and are theoretically impossible (or at least extremely difficult) to falsify, allowing to determine whether the users corresponds to who they claim to be or not.

The user identification process is built on top of the so called validation or authentication mechanisms. Such mechanisms are designed to validate some information that the user brings in order to access the requested (digital) services. The carried information (which the user provides to the authentication mechanism to be validated) usually fall into one of the following categories: something that the user knows (e.g., a secret keyword), something that the user owns (e.g., an physical object also called physical token, like a smartcard, a SIM card, an NFC tag . . . ), something that the owner is (e.g., any measurable physical feature, univocally identifying the user, like fingerprints or iris identification), something that the user does (e.g., motion patterns), or somewhere that the user is (e.g., being in a specific location). This information is what is known as identifier or digital credential. Sometimes a combination of information belonging to different of these categories is used, in order to improve security.

It is important to notice that in the digital world a physical check of the user may not be performed. As such there exist a high probability of leaked credentials that are used for identity fraud. In order to minimize such probability of fraud, identification (authentication) systems require the combination of different kinds of information (information belonging to different categories among the ones stated in the previous paragraph or belonging to the same category but being of different type, for example fingerprints and iris identification) in order to obtain resilient results, improving therefore security. Each kind of information used in the process is referred to as "authentication factor" or "identification factor". The different used authentication factors may be carried by different and independent channels, in order to guarantee robustness of the identification solution. For instance, a password may be required through an https based connection, while a biometric information may be required through a mobile phone. In this way, an attacker willing to access the service impersonating the real user, should attack the system executing the browser, the https channel for obtaining the password, and, moreover, attack the mobile phone or its connection with the target system.

These independent channels used to transmit the different authentication factors are known as side-channels or out-of-the-band-channels. Many different proposals exist to implement such side-channels, even if the growing usage of mobile phones in recent years make solutions based on that technology the winning ones. As such, for example, SMS, HTTPS, SSL (Secure Sockets Layer), and other mobile communications technologies are ones of the most frequently used technologies to implement the transmission of different authentication factors. Equally, the most used authentication factors follow the evolution of smart phones and exploit the growing number of functionalities they embed and theirs growing precision. In particular, cameras, microphones, accelerometers, capacitive screens and peripherals (e.g., stylus) are all used to support authentication factors in user identification solutions, usually based on biometry. On the other side, communications technologies as for example Bluetooth, NFC (Near Field Communications) and similar are generally used to support authentication factors based on "something that the user owns", like a hardware token (NFC card, etc.). In this case, the hardware token will transmit its identification to the authentication system using any of these technologies (Bluetooth, NFC . . . ).

The effectiveness of any identification/authentication solution against another cannot be measured only in terms of security—as many of them are equivalent on that aspect—but rather account also for usability, ease of implementation, cost and energy consumption. Only by keeping into account all these aspects at the same time it is possible to obtain a wide adoption of the authentication solution by the users.

Hence, there is a need of a technical solution for authenticating mobile devices users in a highly reliable way and that, at the same time, is usable, easy to implement, simple, cheap and with minimum energy consumption

SUMMARY OF THE INVENTION

Present invention solves the aforementioned problems by providing a method, application and system for authentication of a mobile device user, based on the measurement of electromagnetic fields modified by an specific magnetic object (called magnetic token or only token) associated to the user.

For the measurement of said electromagnetic fields, it is used a magnetometer which is capable of measuring electromagnetic fields (for example, the strength and orientation of the electromagnetic field among other parameters). Such a meter is presented in most of the last generation mobile devices, so it is not needed to add any hardware element to the standard mobile device to implement the present invention. The magnetometer is based on a specific hardware measuring the variation of the electromagnetic flow, usually used to estimate the device position with respect to the Earth electromagnetic field. The typical app exploiting this meter or sensor is the compass. On the other side, the magnetometer is able to measure any variation in the electromagnetic field, including the variations inducted by the meter itself.

The magnetometer is exploited to measure (register) the field modification induced by specific magnetic tokens (made of ferromagnetic materials or any other type of magnetic materials), allowing to univocally distinguish the used token and the way it is interacting with the phone, in a 3D space. This univocal registering process will be able to obtain new authentication factors, including something that the user owns (i.e., the token), something that the user knows (i.e., the interaction between the token and the device), and somewhere that the user is (i.e., where the interaction takes place).

According to a first aspect of the invention, it is provided a method for authenticating a user of a mobile communications device (e.g. for accessing a certain service), the method comprising the following steps:

a) the mobile communications device making (e.g. using a magnetometer) a first electromagnetic, EM, field measurement (baseline measurement without the interference of the magnetic token), and going to step b);

b) the mobile communications device making a second electromagnetic field measurement after a magnetic token (a magnetic object) associated to said user has been placed (by the user) in a pre-established (predetermined) first position, and going to step c);

c) the mobile communications device making at least a third electromagnetic field measurement after the magnetic token has been placed (by the user) in at least a pre-established second position different to the first position, and going to step d);

d) determining from the (first, second and third) measurements made, an EM signature of the token and at least one EM signature for the modification of the token position, and going to step e);

e) in a server (e.g. an authentication server associated to the certain service that the user wants to access), verifying whether the determined EM signature of the token is authorized by comparing the determined EM signature of the token with a stored authorized EM signature of the token and/or verifying whether the at least one determined EM signature for the modification of the token position is authorized by comparing the at least one determined EM signature for the modification of the token position with at least one stored authorized EM signature for the modification of the token position and/or verifying whether a shift in the mobile communications device location (or more specifically a change in the electromagnetic field due to a shift in the mobile communications device location) from a reference location is within an authorized range, and going to step f);

f) if any of the verifications performed in step e) is negative, considering the authentication unsuccessful and the server sending an unsuccessful authentication message to the mobile device, otherwise the server sending a successful authentication message to the mobile device.

In step a), the server may send a message to the mobile device specifying which authentication factors to use (that is, if only the shift in the mobile communications device location, only the EM signature of the token, only the EM signature of the modification of the token position, two of them or the three of them must be verified in step e)).

In an embodiment, the shift in the mobile communications device location is determined by comparing the first electromagnetic field measurement made in step a) with an stored electromagnetic field measurement previously made in a reference location (without the interference of the token) and in step d) the EM signature of the token is determined as the difference between the second EM field measurement and the first EM field measurement and the EM signature of the modification of the token position is determined as the difference between the at least third EM field measurement and the second EM field measurement.

After step a) and previous to step b), the mobile communications device may notify the user to locate the token in the pre-established first position through an user interface of the mobile communications device and after step b) and previous to step c), the mobile communications device may notify the user to locate the token in at least the pre-established second position through the user interface of the mobile communications device.

In an embodiment, after step c), the first, second and third electromagnetic field measurements are sent by the mobile communications device to the server and the server performs the determination of the shift in the location of the mobile communications device, the EM signature of the token and the EM signature of the modification of the token position.

In an embodiment, step d) is performed by the mobile communications device and after step d) and previous to step e) the determined EM signature of the token and/or the determined EM signature for the modification of the token position is sent from the mobile communications device to the server (and also the first electromagnetic field measurement may be sent to the server to calculate the shift in the mobile device location).

In an embodiment, the determined EM signature of the token and/or the determined EM signature for the modification of the token position and/or the first electromagnetic field measurement is sent from the mobile communications device to the server, according to a previous message received in the mobile communications device from the server, specifying the authentication factors the server needs in order to perform the authentication.

The server may be external to the mobile communications device (and the communications between the mobile communications device and the server are made through a communication networks) or the server may be an internal module of the mobile communications device.

There may be a previous registration step where an electromagnetic field measurement (baseline measurement) in a reference location is measured and stored in the server, the EM signature of the authorized token associated to the user is measured and stored in the server as an authorized EM signature for tokens and, for each authorized token, the EM signature of the authorized movements of the tokens are measured and stored in the server as authorized EM signatures for the modification of the token position.

In an embodiment, the authentication method is triggered by a request of the user to the mobile device to access a certain service and, in this case, the token association to the user may be registered and the first and the at least second pre-established positions may be provided to the user during a user registration in the certain service.

In an embodiment, the token associated to the user is different to other tokens associated to other users and the minimum difference between tokens depends on the sensitivity of the magnetometer of the mobile communication device.

In an embodiment, in step c) the token is placed in more than one pre-established positions different to the first position and for each position an electromagnetic field measurement is performed, in step d) for each pre-established position in which the token has been placed in step c), an EM signature for the modification of the token position is obtained and in step e) it is verified if each obtained EM signature for the modification of the token position is authorized.

According to another aspect of the present invention, it is proposed a system for authenticating a user of a mobile communications device, the system comprising:
 a magnetic token associated to the user of the mobile communications device (registered in the system as associated to the user);
 the mobile communications device comprising:
  a magnetometer configured to:
   make a first electromagnetic, EM, field measurement (without the presence of the magnetic token close to the device);
   after the first measurement, make a second electromagnetic field measurement after the magnetic token has been placed in a pre-established first position;
   after the second measurement, make at least a third electromagnetic field measurement after the magnetic token has been placed in at least a pre-established second position;
  a processor configured to determine from the measurements made, an EM signature of the token and at least one EM signature of the modification of the token position;
  transmission means for transmitting the first electromagnetic field measurement and/or the EM signature of the token and/or the at least one EM signature of the modification of the token position to a (authentication) server;
 the server comprising:
  a processor configured to:
   verify whether the determined EM signature of the token is authorized by comparing the determined EM signature of the token with a stored authorized EM signature of the token and/or verify whether the determined at least one EM signature for the modification of the token position is authorized by comparing the determined at least one EM signature of the modification of the token position with at least one stored authorized EM signature of the modification of the token position and/or verify whether a shift in the mobile communications device location from a reference location is within an authorized range;
   if any of the verifications performed is negative, considering the authentication unsuccessful; otherwise considering the authentication successful;
  transmission means for transmitting the result of the authentication to the mobile communications device.

According to another aspect of the present invention, it is proposed an application for authenticating a user of the mobile communications device (when running on the mobile communications device). The application comprising instructions causing the mobile communications device to:
 make a first electromagnetic, EM, field measurement;
 after the first measurement, make a second electromagnetic field measurement after a magnetic token associated to the user has been placed in a pre-established first position;
 after the second measurement, make at least a third electromagnetic field measurement after the magnetic token has been placed in at least a pre-established second position;
 determine from the measurements made an EM signature of the token and at least one EM signature of the modification of the token position;
 transmitting the first electromagnetic field measurement and/or the EM signature of the token and/or the at least one EM signature of the modification of the token position to a server;
 receiving the result of an authentication performed by the server based on a shift in the mobile communications device location from a reference location obtained from the transmitted first electromagnetic field measurement and/or the transmitted EM signature of the token and/or the transmitted at least one EM signature of the modification of the token position;
 showing the result of the authentication to the user through a user interface of the mobile communications device.

A last aspect of the invention refers to a computer program product comprising computer program code adapted to perform the method of the invention, when said program code is executed on a computer, mobile phone, a digital signal processor, a field-programmable gate array, an application-specific integrated circuit, a micro-processor, a micro-controller, or any other form of programmable hardware. A non-transitory digital data storage medium is also provided for storing a computer program which comprises instructions causing a computer executing the program to perform the above-described method.

The proposed invention implies many advantages compared to prior art solutions, as for example:
 No energy consumed by the token (i.e., passive token)
 No magnetic charge required on the token (i.e., no interferences caused)
 Usability: Light and small token, easy to carry.
 Ease of implementation and low cost: Solution based on standard equipment of common mobile phones so not hardware element has to be added to the mobile device (mobile phone). Moreover the token is easy and very cheap to build.
 Highly reliable authentication: Three authentication factors offered: (i) something that the user has, (ii) something that the user owns, and (iii) somewhere that the user is.

BRIEF DESCRIPTION OF THE SEVERAL VIEWS OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DESCRIPTION OF SPECIFIC EMBODIMENTS OF THE INVENTION

The invention describes a method, system and application for, in general terms, authenticating a mobile device user (for providing a certain service to the user). Said authentication is based on the measurement of electromagnetic fields (performed by a magnetometer usually integrated in the mobile device) modified by a specific magnetic object (called magnetic token or only token) associated to the user in different positions. Said magnetic token is made of ferromagnetic materials (materials with ferromagnetic properties) and it is also called "hardware token" in order to indicate that it is not a software element but a physical object.

In the present solution, the magnetometer is managed (e.g. by an application in the mobile device) to register the field modification induced by the user's token allowing to univocally distinguish the used token and the way it is interacting with the mobile device (a mobile phone, laptop, i-pad, tablet or any other type of mobile communications device). It is important to highlight that the token induces a modification of the electromagnetic field because it is made of a ferromagnetic material and it does not need any electrical current to modify the EM field. That is, the token is a "passive" token in the sense that it does not consume any energy.

The authentication process leverages on several characteristics of the Electromagnetic (EM) fields, as for example:

The Electromagnetic (EM) field measured by a device changes as a function of the orientation of the device itself.

The EM field measured by a device is similar in different locations which are close in terms of geographical coordinates, while it is different in locations which are distant in terms of geographical coordinates. That is, the EM field measured by a device depends on the location of the device.

The presence of (ferro)magnetic elements (in this case, the token) in the surroundings changes the EM field measured by a device, with a higher impact the closer and the bigger the element is.

The presence of a certain (ferro)magnetic element in the same position produce always the same modification in the EM field measured, while different (ferro)magnetic elements (different by size and and/or by shape), result in different variations of the EM field measured by the device. That is, the modification in the EM field depends on the characteristic of the element, and particularly on the size and shape of the (ferro)magnetic element.

The spatial orientation of the (ferro)magnetic element changes its impact on the EM field measured by the mobile device. So the modification in the EM field measured depends not only on the size and shape of the (ferro)magnetic element but also in its orientation and position.

Different (ferro)magnetic elements results in different alignment times (the time it takes for the EM field to adapt to a change) for the EM field measured by the mobile device.

Figure 1:
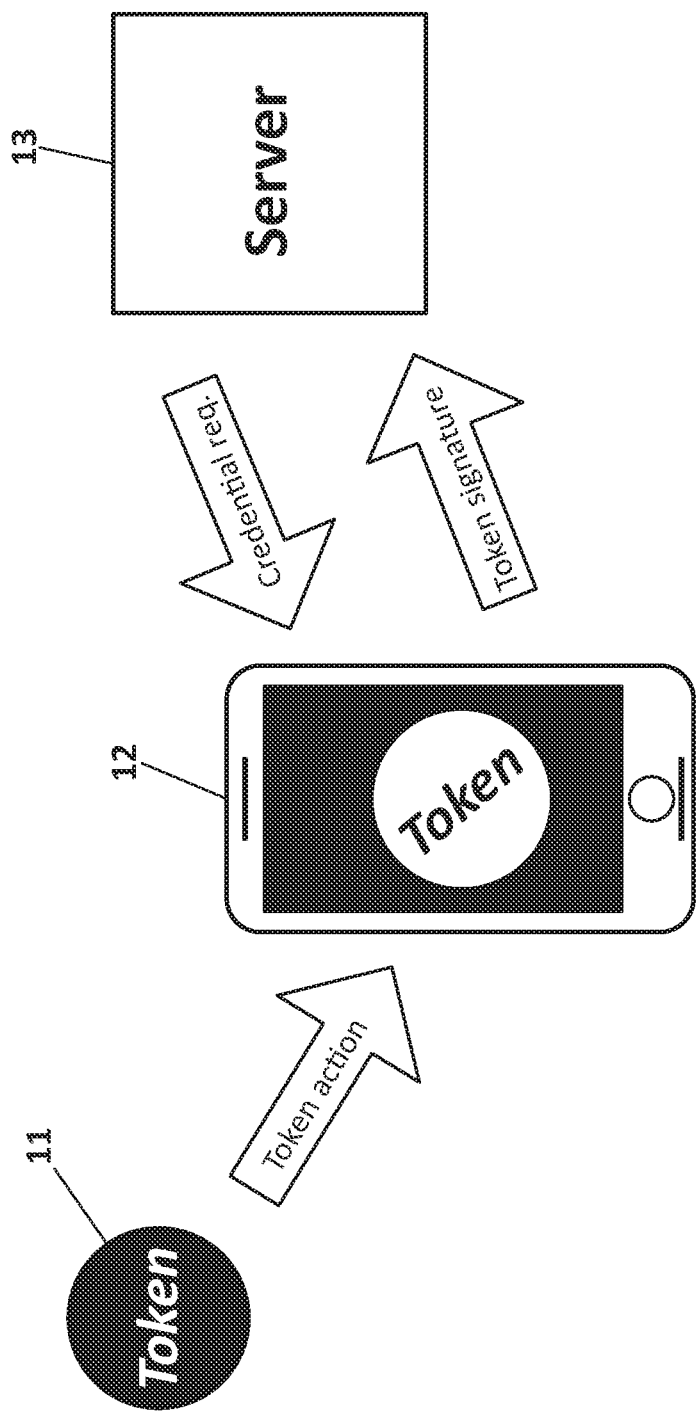
FIG. 1 shows a schematic block diagram of the authentication system according to one embodiment of the present invention.

FIG. 1 shows a possible implementation of an authentication system based on the proposed solution. In an embodiment, when an user wants to access to a certain service (or services) through a mobile device (12), the mobile device first establish an authentication process with an electronic server (13) associated to the certain service in order to authenticate the user (to verify that said user is allowed to access to said certain service). As part of said authentication process the server, requests to the mobile device the authentication credentials of the user (in this case, the electromagnetic field signature). In order to provide said credentials, the user's token (11) with ferromagnetic properties is placed close to the mobile device (12) or even on the mobile device (12), in a first given position. Then it is changed of position according to a pattern (known by the user) in order to generate an electromagnetic field signature. Said signature is measured by a magnetometer in the mobile device (12) and sent to the server (13). Said server is usually called authentication server. When the server receives the token signature, the server verifies whether the signature corresponds to the proper token, moved according to the proper pattern, and optionally acted within eventual set geographical limitations (a certain geographical range). If the verification is successful the server grants the user with the access to the requested service. If not, the server does not grant the access and usually it sends a message to the mobile device denying the provision of said service to the user.

In other words, the authentication process proposed by the present invention process includes the measurement of the electromagnetic variation when the token associated to the user is placed in a given position with respect to the mobile device, and then the measurement of the variation in at least a second position (all the positions are known by the user and preregistered in the server). The measurement will extract a unique signature allowing to univocally identify the used token (and consequently the mobile device user as each token is univocally associated to a user) and the modifications in the token position, as well as a shift (modification) in the mobile device location (or in other words, a shift in the user location).

As said above, the measured EM field (and therefore the variation a token induces on the measured EM field) depends on the location, as such, a distortion is added to the measurements made if the location is far from the one of the original (reference) measuring. This distortion (change) may be absorbed in proper measurement thresholds—if location is not used as an authentication factor—or used to grant/deny authentication to the user. If the location is used as an authentication factor a threshold on the distortion on the measured EM field is established and, as consequence a threshold of user (mobile device) displacement from the original measurement location (reference location) is set. That is, if the distortion on the measured EM field (difference between the measured field and the stored measured field) is above a threshold, it will imply that the difference of location is bigger than accepted and the authentication result will be negative (if the location is used as an authentication factor). If the location is not used as an authentication factor, the location distortion would not be taken into account for the authentication. This will be done by using proper (bigger) measurement thresholds so a change (distortion) between the measured EM signatures and the stored signatures (due to a change of location) would be allowed.

If for any reason, not only a shift in the device location but the exact location of the mobile device is needed, a known location mechanism could be used (for example, GPS, GSM location methods or any other known location method).

Figure 2:
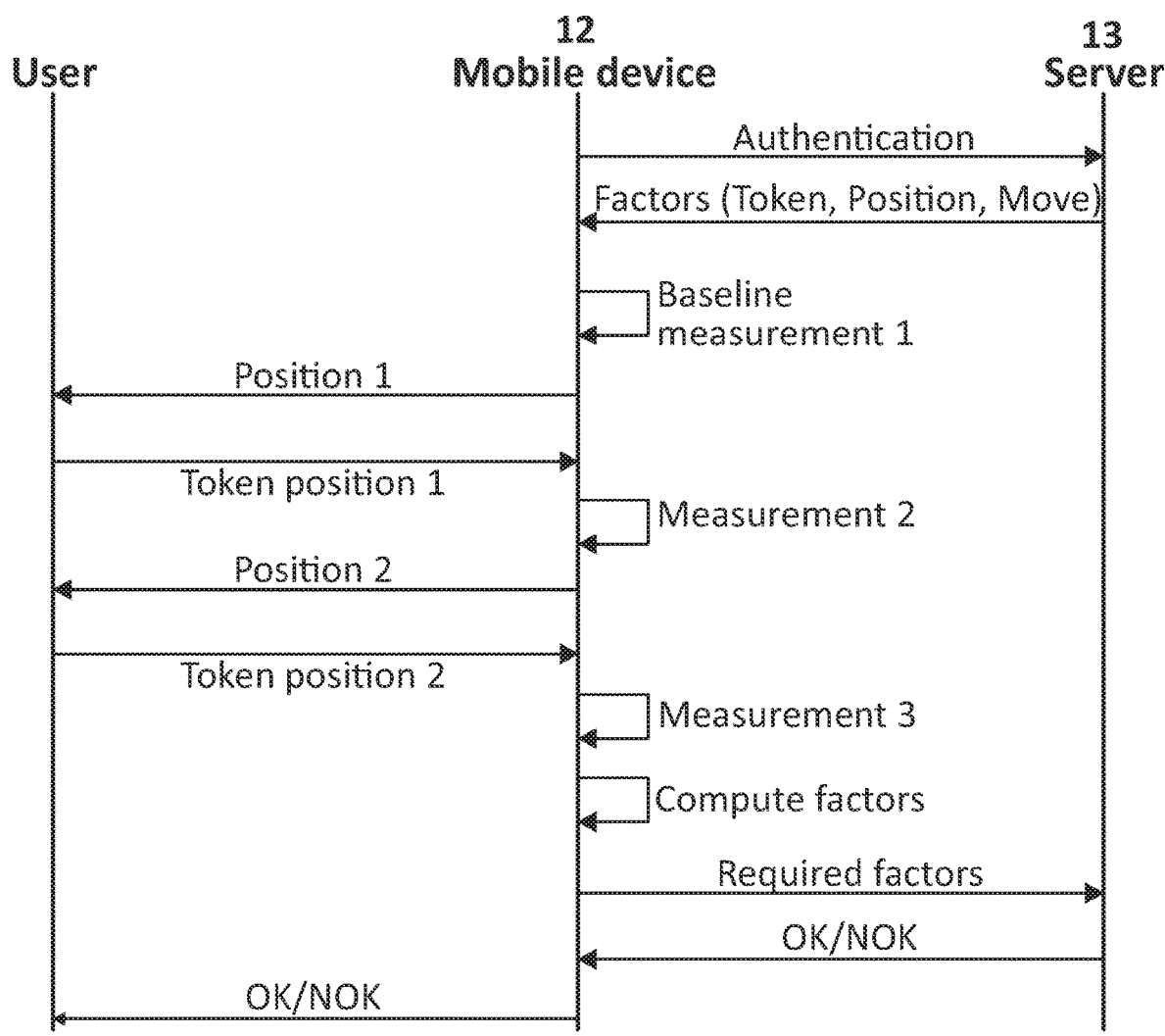
FIG. 2 shows an overview of the flow diagram of an authentication method according to an embodiment of the invention.

For a better understanding of the present invention, the steps of the proposed authentication method according to an embodiment of the invention (as depicted in FIG. 2) will be disclosed here (this is only a possible embodiment, and not all the cited steps are essential and mandatory in all the embodiments of the present invention):

1. The device sends an authentication message to the server to start the authentication process with the server. This authentication process is usually triggered because previously, the user has requested to the mobile device to access a certain service and, in order to access said certain service, an authentication of the user is required. Optionally, in the authentication process the mobile device informs to the server, an identification of the user (user ID) which wants to access to the service.
2. The server asks for the required one or more authentication factors: token identification and/or token movement (also called token position) and/or shift (also called change or modification or movement) in the mobile device location (or more exactly, the distortion in the measured EM field due to the change in the mobile device location). As stated above, from the measurements made, it can be inferred if the proper combination of token identification+token movement+location is used.
3. The mobile device (its magnetometer) measures the baseline EM field (Measurement 1). The baseline EM field is the EM field measured without the presence (interference) of the token.
4. After a certain period of time or after a notification of the mobile device (through a mobile device user interface, for example with a message on the screen of the mobile device or voice), the user sets the token to a known first position. It is important to say that the exact features of the first position is not notified in this step to the user, but said first position is pre-established and previously informed to the user (for example, during the registering of the user in the service). This way, if somebody is impersonating the user, he will not know said first position and the authentication will not be successful.
5. The device measures the EM field (Measurement 2).
6. After a certain period of time or after a notification of the mobile (through a mobile device user interface, for example with a message on the screen or voice), the user locates the token to a known second position. It is important to say that the exact features of the second position is not notified in this step to the user, but said second position is pre-established and previously informed to the user (for example, during the registering of the user in the service). This way, if somebody is impersonating the user, he will not know said second position and the authentication will not be successful.
7. The device measures the EM field (Measurement 3). For the sake of clarity and simplicity and not for limitation, the proposed authentication method is being explained using two pre-established positions of the magnetic token (that is, setting the magnetic token only in two positions); however, the present invention can be applied setting the magnetic token in more than two positions (in that case, steps 6 and 7 will be repeated for each new position). Of course, the more positions used, the stronger the authentication mechanism will be.
8. The mobile device will extract from the measurements 1, 2 and 3 (or more measurements in other positions if the authentication mechanism uses more than two different positions of the token) the token identification and token movement authentication factors. That is, it will extract EM signatures allowing to univocally identify the used token (token signature) and to univocally identify the modification in its position from the first to the second position (token movement signature).

With "token signature" or "token identification signature" it is meant the difference between the baseline measurement and the measurement with the token in the first position. With "token movement signature" or "token position signature" it is meant the difference between the second and third measurement, that is, the difference between the measurements with the token in the first position and the token in the second position (i.e., before and after the position movement). Of course, if the token is set in more than two pre-established positions (a third, fourth . . . position) more than one movement signature will be obtained. Each movement signature will be the difference between the EM field measurement with the token in one position (e.g. the first position) and the EM field measurement with the token in another position (the third, fourth . . . position).

The other authentication factor (shift in the mobile device location) is calculated as the distortion in the measured EM field due to the change in the mobile device location and it is used to define a maximum range of displacement allowed. It will be determined comparing the measured EM field (in the location where the authentication process is being carried out) with the stored measured EM fields (measured in the original or reference location where the reference stored measurements have been made). Specifically, this shift in the mobile device location (or more exactly, the distortion in the measured EM field due to the change in the mobile device location) will be determined usually as the difference between the baseline measurement (measurement 1) and a stored baseline measurement. A threshold on the shift of the location (a threshold on the distortion on the measured EM field) is established and, if the distortion on the measured EM field (difference between the measured field and the stored measured field) is above a certain (pre-established) threshold, the authentication is considered not successful (if the shift in location is used as an authentication factor).

So, for calculating this authentication factor, the stored measurements (which are usually in the server) are needed, so this authentication factor is usually calculated in the server. That is, if the server requires the shift in the mobile device location as an authentication factor, the mobile device sends to the server the baseline measurement and the server calculates this authentication factor, comparing this baseline measurement with the stored baseline measurement. Of course, if the original measurements are stored in the mobile device, this authentication factor (shift in the mobile device location) could be extracted in the mobile device and sent to the server.

9. The mobile device sends (through a communications network) the required authentication factors to the server (or the information to obtain the authentication factor in the case of the shift in the device location). In an alternative embodiment, the mobile device does not extract any authentication factors, but the mobile device sends to the server the baseline measurement, measurement 2 and 3 and the server extracts from said measurements the authentication factors.

10. The server compares the requested authentication factors to the authorized correct authentication factors stored in the server (or in a database external to the server) and, depending on said comparison, acknowledges or rejects the authentication. In order to do so, depending on the authentication factors used, for example, the server will check whether the extracted shift in location of the mobile device is within the authorized ranges and/or the server will check whether the extracted movement of the token (token movement signature) from the first to the second position coincides with the pre-established token movement signature and/or the server will compare the extracted electromagnetic signature of the token with the electromagnetic signatures of authorized tokens (most specifically, in an embodiment the server will compare the extracted electromagnetic signature of the token with the electromagnetic signature stored for the token associated to said user).

11. The server notifies to the mobile device the authentication result and access to the service will be granted or denied to the user according to said result (and usually the mobile device also notifies to the user the authentication result).

The authentication factors may be any combination of shift on the location (user/mobile device displacement from the original measurement venue) and/or token identification and/or token movement (change of position). For a higher security, the three authentication factors should be used, that is it is verified whether the signature corresponds to the proper token, moved according to the proper pattern, and the shift in location is within a pre-established range (that is, if the token signature is valid and the token movement signature is valid, it is checked if the distortion on the EM field measurements due to a change in the mobile device location is within an authorized range). Also, it can be used only the shift in location and the token identification, the shift in location and the token movement, the token movement and the token identification or any of the three factors alone. It is not recommended to only use the shift in location because in that case, the authentication will not depend on the user's token and, therefore, it will not really authenticate the user but only its change in geographical location.

In a preferred embodiment, the server is external to the mobile device and, in this case, the communication between the mobile device and the (external) server is made through a communication networks which can be any kind of communications network (for example, a mobile communications network, 2G-GSM, 3G-UMTS, 4G, LTE or of any other type). In an alternative embodiment, the authentication server will not be external to the mobile device but it will be a module of the mobile device. That is, all the authentication process will be made in the mobile device without any communication with an external server.

The authentication procedure may include (previous to any authentication) a registration phase (also called learning phase) where the baseline EM field (without the presence of the token) and/or the EM footprint (signature) of the token (for example, the EM measured when the token is in the first position) and/or the EM footprint of the movement of the token (this EM footprint of the movement may be the EM measurement when the token is in the second position or the difference between the EM measurement when the token is in the first position and the EM measurement when the token is in the second position) are measured (registered) by the mobile device and shared with the server (eventually not through the communications network but through a side-channel). In the comparison step of the authentication procedure (step 10), the server will compare the received signature with these previously registered signatures to determine if the token and/or the movement is authenticated. That is, if the received token signature and the received token movement signature coincide with the pre-registered signatures or they are similar (that is, the signatures are not exactly the same but they are within a certain range of the pre-registered signatures), then the authentication is successful (if the shift in mobile device location is required as an authentication factor, the shift will be calculated from the baseline measurements, and it will be also checked if this shift is within an authorized range in order to the authentication be successful).

In an embodiment, the token may be hidden in a cover of non-ferromagnetic material (not impacting the EM field), on order to preserve the token characteristics. The cover may be personalized with images and logos. The token can be of any ferromagnetic material, of any size, shape or weight but it is preferable that it has a weight and size that it can be easily carried by the user (for example in a pocket).

Figure 3A:
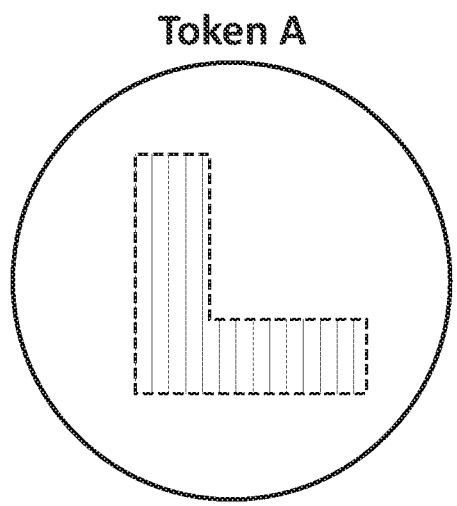
FIG. 3a shows a view from above of an exemplary first token according to an embodiment of the invention.
Figure 3B:
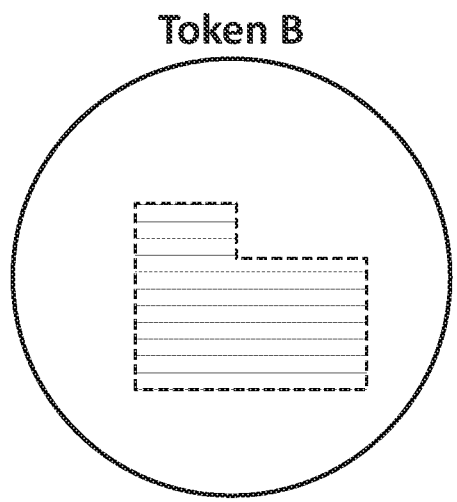
FIG. 3b shows a view from above of an exemplary second token according to an embodiment of the invention.
Figure 3C:
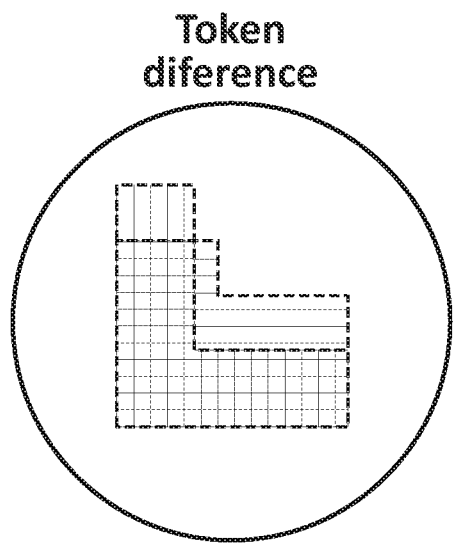
FIG. 3c shows a view from above of the difference between the first and second token according to an embodiment of the invention.

The effect of the token in the EM field measured by the magnetometer (that is, the variation of the EM field in the presence of the token) depends on the token size and shape and as such, an infinite number of variations is possible. To this extent, when building the tokens a minimum difference in shape and/or size among the different tokens should be kept in order to account for the magnetometer measurement sensitivity. A possible implementation of an authentication system based on the proposed solution may consider ε as the difference between two different tokens. In FIGS. 3a and 3b, it is shown a top view of a first and second exemplary tokens respectively, tokens A and B (this is only an example, and the tokens can be of others shapes and sizes) A 2-dimensional difference between the two example tokens A and B is shown in FIG. 3c, where ε would amount to the sum of the two difference volumes: the "missing" part of token B (vertical lines in FIG. 3c, the part that exists in token A but not in token B) and the "extra" one (horizontal lines in FIG. 3c, the part that exists in token B but not in token A). Considering the minimum available measurement sensitivity among magnetometers in the considered set of target mobile devices, a proper minimum difference ($\varepsilon_{min}$) between the tokens should be set. In other words, the difference in size or shape of the tokens should be big enough (bigger than a minimum) so the difference in the variation of the EM field in the presence of each token is sufficient to be distinguished by the magnetometers (taking into account the measurement sensitivity of the magnetometers in the mobile devices where these authentication method is going to be used).

The authentication resulting from the proposed solution may be used both to access remote services and/or to lock/unlock specific services (also called functionalities) on the mobile device itself. In this latter case (lock of specific functionalities of the mobile device), the authentication could be performed in the mobile device itself or in an external server.

In an embodiment, an authentication system based on the proposed solution may include a back-up authentication method, eventually based on a side-channel, in order to cope with token lost and eventual consequent replacement.

The expressions mobile device or mobile communications device as used herein and throughout this specification, refers to any portable electronic device capable of sending or receiving data using wireless technology, as for example a mobile telephone, an smartphone, a laptop, a PC, A personal Digital Assistant (PDA) a tablet, an i-pad or any other mobile communications device.

The term "comprises" and the derivations thereof (such as "comprising", etc.) must not be understood in an exclusive sense, i.e., these terms must not be interpreted as excluding the possibility that what is described and defined may include additional elements, steps, etc.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. Although the present invention has been described with reference to specific embodiments, it should be understood by those skilled in the art that the foregoing and various other changes, omissions and additions in the form and detail thereof may be made therein without departing from the scope of the invention as defined by the following claims.

Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. Method for authenticating a user of a mobile communications device, the method comprising following steps:
    a) the mobile communications device making a first electromagnetic, EM, field measurement, and going to step b);
    b) the mobile communications device making a second electromagnetic field measurement after a magnetic token associated to said user has been placed in a pre-established first position, and going to step c);
    c) the mobile communications device making at least a third electromagnetic field measurement after the token has been placed in at least a pre-established second position, and going to step d);
    d) determining from the measurements made, an EM signature of the token and at least one EM signature of a modification of token position from the pre-established first position to the pre-established second position, and going to step e);
    e) in a server, verifying whether the determined EM signature of the token is authorized by comparing the determined EM signature of the token with a stored authorized EM signature of the token and/or verifying whether the at least one determined EM signature of the modification of the token position is authorized by comparing the at least one determined EM signature of the modification of the token position with at least one stored authorized EM signature of the modification of the token position and/or verifying whether a shift in a mobile communications device location is within an authorized range;
    f) if any of the verifications performed in step e) is negative, considering the authentication unsuccessful and the server sending an unsuccessful authentication message to the mobile device, otherwise the server sending a successful authentication message to the mobile device.

2. A method according to claim 1 where, previously to step a), the server sends a message to the mobile device specifying if only the shift in the mobile communications device location, only the EM signature of the token, only the EM signature of the modification of the token position, two of the verifications or the three of the verifications must be verified in step e).

3. A method according to claim 1 where:
    the shift in the mobile communications device location is determined by comparing the first electromagnetic field measurement made in step a) with an stored electromagnetic field measurement previously made in a reference location,
    in step d) the EM signature of the token is determined as difference between the second EM field measurement and the first EM field measurement and the EM signature of the modification of the token position is determined as difference between the at least third EM field measurement and the second EM field measurement.

4. A method according to claim 1 where after step a) and previous to step b), the mobile communications device notifies the user to locate the token in the pre-established first position through a user interface of the mobile communications device and after step b) and previous to step c), the mobile communications device notifies the user to locate the token in at least the pre-established second position through the user interface of the mobile communications device.

5. A method according to claim 1 where after step c), the first, second and third electromagnetic field measurements are sent to the server and the server performs the determination of the shift in the location of the mobile communications device, the EM signature of the token and the EM signature of the modification of the token position.

6. A method according to claim 1 where step d) is performed by the mobile communications device and after step d) and previous to step e) the determined EM signature of the token and/or the determined EM signature of the modification of the token position is sent from the mobile communications device to the server.

7. A method according to claim 6 where the determined EM signature of the token and/or the determined EM signature of the modification of the token position and/or the first electromagnetic field measurement is sent from the mobile communications device to the server, according to a previous message received in the mobile communications device from the server, specifying authentication factors the server needs to perform the authentication.

8. A method according to claim 1 where the server is external to the mobile communications device and the communications between the mobile communications device and the server are made through a communication networks.

9. A method according to claim 1 where the server is an internal module of the mobile communications device.

10. A method according to claim 1 where there is a previous registration step where an electromagnetic field measurement in a reference location is measured and stored in the server, the EM signature of authorized tokens are measured and stored in the server as authorized EM signatures for tokens and, for each authorized token, the EM signature of the authorized movements of the tokens are measured and stored in the server as authorized EM signatures of the modification of the token position.

11. A method according to claim 1 where the authentication method is triggered by a request of the user to the mobile device to access a certain service and the token association to the user is registered and the first and the at least second pre-established positions are provided to the user during a user registration in the certain service.

12. A method according to claim 1, where in step c) the token is placed in more than one pre-established positions and for each position an electromagnetic field measurement is performed, where in step d) for each pre-established position in which the token has been placed in step c) an EM signature of the modification of the token position is obtained and where in step e) it is verified if each obtained EM signature of the modification of the token position is authorized.

13. A non-transitory digital data storage medium for storing a computer program which comprises instructions causing a computer executing the program to perform the method according to claim 1.

14. System for authenticating a user of a mobile communications device, the system comprising:
a magnetic token associated to the user of the mobile communications device;
the mobile communications device comprising:
a magnetometer configured to:
make a first electromagnetic, EM, field measurement;
after the first measurement, make a second electromagnetic field measurement after the magnetic token has been placed in a pre-established first position;
after the second measurement, make at least a third electromagnetic field measurement after the magnetic token has been placed in at least a pre-established second position;
a processor configured to determine from the measurements made, an EM signature of the token and at least one EM signature of the modification of the token position;
transmission means for transmitting the first electromagnetic field measurement and/or the EM signature of the token and/or the at least one EM signature of a modification of token position from the pre-established first position to the pre-established second position to a server;
the server comprising:
a processor configured to:
verify whether the determined EM signature of the token is authorized by comparing the determined EM signature of the token with a stored authorized EM signature of the token and/or verify whether the determined at least one EM signature of the modification of the token position is authorized by comparing the determined at least one EM signature of the modification of the token position with at least one stored authorized EM signature of the modification of the token position and/or verify whether a shift in a mobile communications device location is within an authorized range;
if any of the verifications performed is negative, considering the authentication unsuccessful, otherwise considering the authentication successful;
transmission means for transmitting result of the authentication to the mobile communications device.

* * * * *